(12) United States Patent
Kodo et al.

(10) Patent No.: US 7,874,058 B2
(45) Date of Patent: Jan. 25, 2011

(54) AUTOMOTIVE BODY TRANSFER METHOD AND TRANSFER SYSTEM

(75) Inventors: Taro Kodo, Sayama (JP); Akira Suzuki, Sayama (JP); Chiyuki Uekusa, Sayama (JP); Minoru Yamada, Sayama (JP); Katsumi Kaneko, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 959 days.

(21) Appl. No.: 11/665,036

(22) PCT Filed: Jul. 22, 2005

(86) PCT No.: PCT/JP2005/013464

§ 371 (c)(1),
(2), (4) Date: Apr. 10, 2007

(87) PCT Pub. No.: WO2006/046335

PCT Pub. Date: May 4, 2006

(65) Prior Publication Data

US 2009/0013524 A1    Jan. 15, 2009

(30) Foreign Application Priority Data

Oct. 28, 2004    (JP) .............................. 2004-313851

(51) Int. Cl.
*B23Q 7/00* (2006.01)
*B23P 11/00* (2006.01)

(52) U.S. Cl. .............................. 29/430; 29/559; 29/784; 29/822; 29/823; 29/824; 29/281.1

(58) Field of Classification Search .................. 29/430, 29/559, 822, 823, 824, 784, 799, 281.1
See application file for complete search history.

(56) References Cited

U.S. PATENT DOCUMENTS

| 4,658,501 | A  |   | 4/1987  | Fujii et al.              |
|-----------|----|---|---------|---------------------------|
| 4,796,346 | A  | * | 1/1989  | Kawasaki et al. ... 29/700 |
| 4,894,909 | A  | * | 1/1990  | Sakamoto et al. ... 29/719 |
| 4,928,386 | A  | * | 5/1990  | Schupp et al. ... 29/824   |
| 4,937,929 | A  | * | 7/1990  | Nokajima et al. ... 29/430 |
| 5,088,176 | A  | * | 2/1992  | Koga ... 29/430            |
| 6,109,424 | A  | * | 8/2000  | Doan ... 198/468.8         |
| 6,145,180 | A  | * | 11/2000 | Kogai et al. ... 29/429    |
| 6,339,874 | B2 | * | 1/2002  | Segawa et al. ... 29/824   |

(Continued)

FOREIGN PATENT DOCUMENTS

JP    61025736    2/1986

(Continued)

*Primary Examiner*—Jermie E Cozart
(74) *Attorney, Agent, or Firm*—Carrier Blackman & Associates, P.C.; William D. Blackman; Joseph P. Carrier

(57) ABSTRACT

An automotive body transfer method and a transfer system is operable to transfer a vehicle body between a transfer mechanism and a stationary assembly station in an automobile production process. In the method and system hereof, one longitudinal half of each of front and rear pairs of left and right jack-up brackets, formed in lower parts of left and right side sills of the body, is supported by the transfer mechanism, and the other longitudinal half of each of the jack-up brackets is supported by the stationary assembly station, thereby enabling the shape and structure of the transfer mechanism and the stationary assembly station to be simplified.

8 Claims, 13 Drawing Sheets

U.S. PATENT DOCUMENTS

| | | |
|---|---|---|
| 6,604,279 B2 * | 8/2003 | Kurtz .......................... 29/705 |
| 2008/0000068 A1 * | 1/2008 | Savoy et al. .................. 29/429 |
| 2008/0000069 A1 * | 1/2008 | Savoy ......................... 29/430 |
| 2008/0276769 A1 * | 11/2008 | Zach et al. .................... 81/434 |

FOREIGN PATENT DOCUMENTS

| | | |
|---|---|---|
| JP | 63-235184 | 9/1988 |
| JP | 04-080776 | 12/1992 |
| JP | 05-016725 | 3/1993 |
| JP | 07-136798 | 5/1995 |
| JP | 2516186 | 8/1996 |
| JP | 2000-095161 | 4/2000 |
| JP | 2001-138969 | 5/2001 |

* cited by examiner

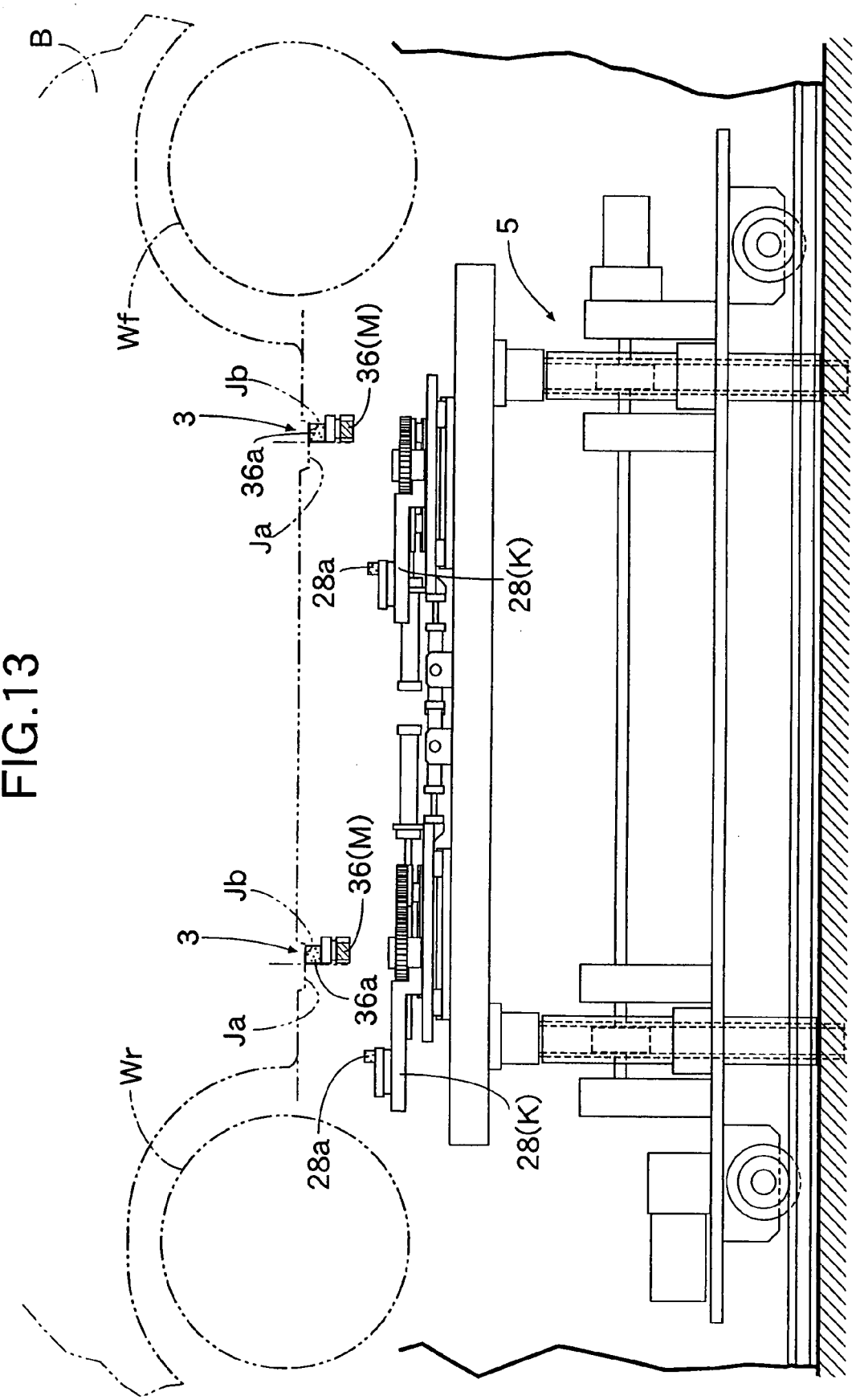

AUTOMOTIVE BODY TRANSFER METHOD AND TRANSFER SYSTEM

TECHNICAL FIELD

The present invention relates to an improvement of an automotive body transfer method and transfer system for carrying out handing over of a body between transfer means and transferred-to means in an automobile production process.

BACKGROUND ART

Such automotive body transfer method and transfer system are known, as disclosed in, for example, Patent Publication 1 below.

Patent Publication 1: Japanese Patent Application Laid-open No. 2000-95161

DISCLOSURE OF INVENTION

Problems to be Solved by the Invention

In a conventional automotive body transfer method and transfer system, when a body is supported by transfer means and transferred-to means, the base of the body is supported, but since the body base has a relatively complicated shape, the shape and structure of the transfer means and transferred-to means for supporting the base become complicated.

The present invention has been accomplished under the above-mentioned circumstances, and it is an object thereof to provide an automotive body transfer method and transfer system that enable the shape and structure of transfer means and transferred-to means to be simplified.

Means for Solving the Problems

In order to attain the above object, in accordance with a first aspect of the present invention, there is provided an automotive body transfer method when carrying out handing over of a body between transfer means and transferred-to means in an automobile production process, the method comprising: supporting one longitudinal half of each of front and rear pairs of left and right jack-up brackets formed in lower parts of left and right side sills of the body on a push-up section of a jack of the transfer means in contact with each other, and supporting the other longitudinal half of each of the jack-up brackets on a push-up section of a jack of the transferred-to means in contact with each other, positioning the body supported by the transferred-to means in a stationary assembly station, and carrying out bringing-in and taking-out of the body relative to the stationary assembly station by the transfer means and the transferred-to means.

In accordance with a second aspect of the present invention, there is provided an automotive body transfer system for carrying out handing over of a body between transfer means and transferred-to means in an automobile production process, characterized in that the transfer means is formed by mounting, on a carrier moving along a conveying direction of the body, front and rear pairs of left and right support arms capable of supporting one longitudinal half of each of front and rear pairs of left and right jack-up brackets formed in lower parts of left and right side sills of the body so that the support arms can pivot between a working position in which the one half is brought into pushing contact with and supported on the support arms and a retracted position in which the support arms are moved back toward the inside of the body and so that the support arms can move up and down, the transferred-to means comprises front and rear pairs of left and right transferred-to means disposed so as to be able to support the other longitudinal half of each of the jack-up brackets on a push-up section of a jack of the transferred-to means in contact with each other, and the body supported by the transferred-to means is positioned in a stationary assembly station, and bringing-in and taking-out of the body relative to the stationary assembly station are carried out by the transfer means and the transferred-to means.

Further, in accordance with a third aspect of the present invention, in addition to the second aspect, a longitudinal distance between the support arms is adjustable and a longitudinal distance between the transferred-to means is adjustable.

Effects of the Invention

In accordance with the first aspect of the present invention, when transferring the body, since one longitudinal half of each of the four jack-up brackets formed on the lower parts of the left and right side sills of the body is supported by the transfer means, and the other half thereof is supported by the transferred-to means, the body can be transferred appropriately while enabling the shape and structure of the transfer means and the transferred-to means supporting them to be simplified because the above-mentioned jack-up brackets are generally regularly arranged at the four apexes of an imaginary horizontal quadrilateral.

Furthermore, in accordance with the second aspect of the present invention, when transferring the body, since one longitudinal half of each the four jack-up brackets formed on the lower parts of the left and right side sills of the body is supported by the transfer means, and the other half thereof is supported by the front and rear pairs of right and left support arms of the transferred-to means, the body can be transferred appropriately while enabling the shape and structure of the transfer means and the transferred-to means supporting them to be simplified because the above-mentioned jack-up brackets are generally regularly arranged at the four apexes of an imaginary horizontal quadrilateral. Moreover, since each support arm is capable of pivoting between the working position and the retracted position and is capable of moving up and down, when moving without transferring, controlling each support arm so that it is at the retracted position and the downward position enables interference with front and rear wheels of the body that is waiting to be transferred to be avoided.

Furthermore, in accordance with the third aspect of the present invention, adjusting the distance between the sets of front and rear support arms and the longitudinal distance between the transferred-to means makes it compatible with the transfer of bodies having different formats and dimensions, thus contributing to an improvement in the efficiency of production of various models.

BRIEF DESCRIPTION OF DRAWINGS

FIG. 13 is a sectional view along line 13-13 in FIG. 12 (first embodiment).

EXPLANATION OF REFERENCE NUMERALS AND SYMBOLS

B Body
Bs Side sill
J Jack-up bracket
Ja One longitudinal half of jack-up bracket
Jb Other longitudinal half of jack-up bracket
Transferred-to means
Transfer means (first transfer means)
Transfer means (second transfer means)
Carrier
Support arm

BEST MODE FOR CARRYING OUT THE INVENTION

A mode for carrying out the present invention is explained by way of a preferred embodiment of the present invention shown in the attached drawings.

Embodiment 1

Figure 1:
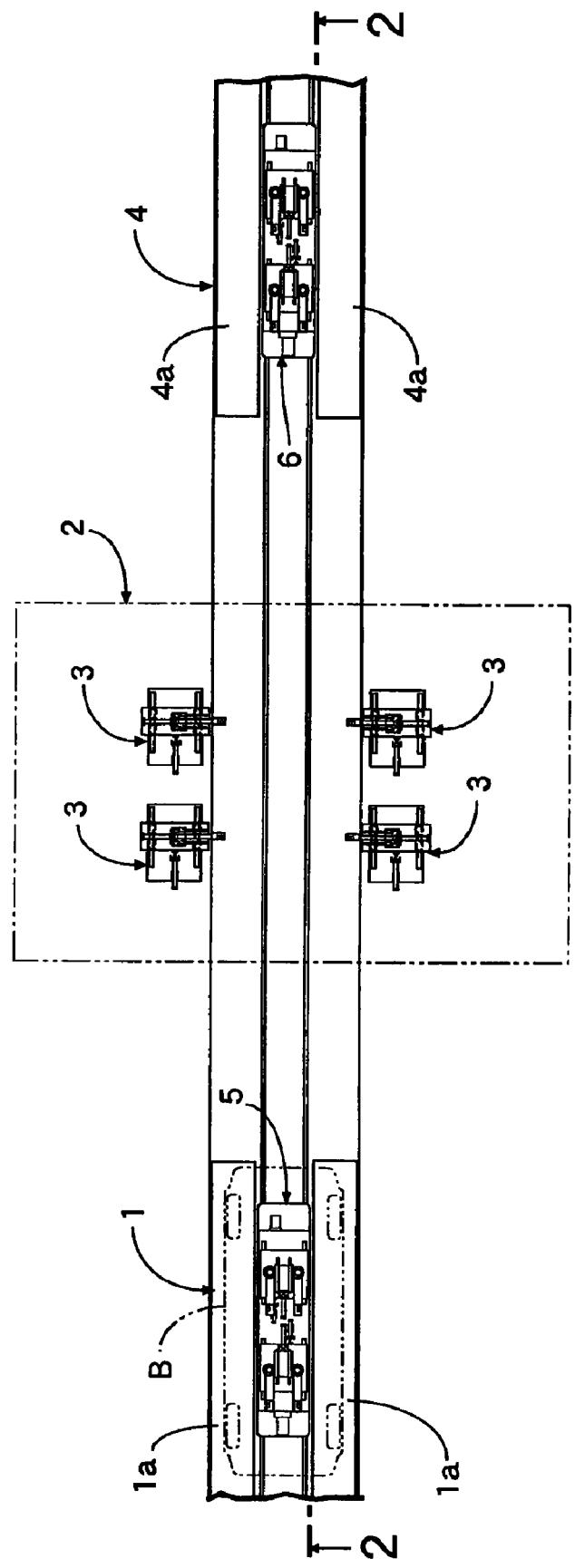
FIG. 1 is a plan view of an automotive body transfer system related to the present invention (first embodiment).
Figure 2:
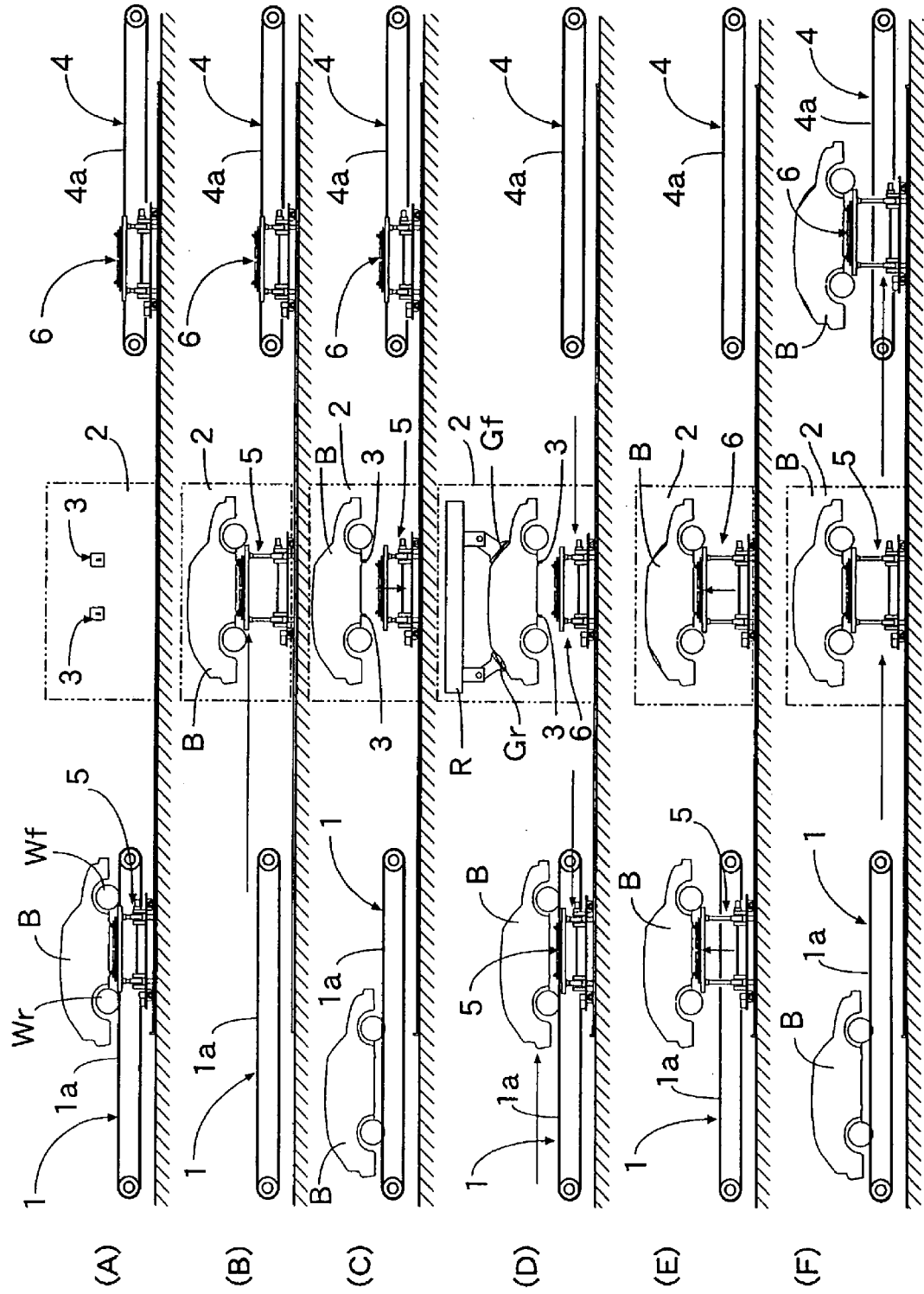
FIG. 2 is a diagram for explaining a process for transferring a body, shown by a sectional view along line 2-2 in FIG. 1 (first embodiment).

Firstly, in FIG. 1 and FIG. 2, an automobile production line is provided from the upstream side thereof, with a first conveyor line 1 comprising a pair of left and right slat conveyors 1a and 1a, a stationary assembly station 2 comprising four transferred-to means 3, 3; 3, 3, and a second conveyor line 4 comprising a pair of left and right slat conveyors 4a and 4a, the first and second conveyor lines 1 and 4 receiving front and rear wheels Wf and Wr mounted on a body B that is being assembled and conveying it in a fixed direction by means of the left and right slat conveyors 1a, 1a; 4a, 4a respectively. First transfer means 5 for transferring the body B that is being assembled from the first conveyor line 1 to the transferred-to means 3, 3; 3, 3 is movably disposed between the first conveyor line 1 and the transferred-to means 3, 3; 3, 3, and second transfer means 6 for transferring the body B that is being assembled from the transferred-to means 3, 3; 3, 3 to the second conveyor line 4 is disposed between the transferred-to means 3, 3; 3, 3 and the second conveyor line 4.

Figure 3:
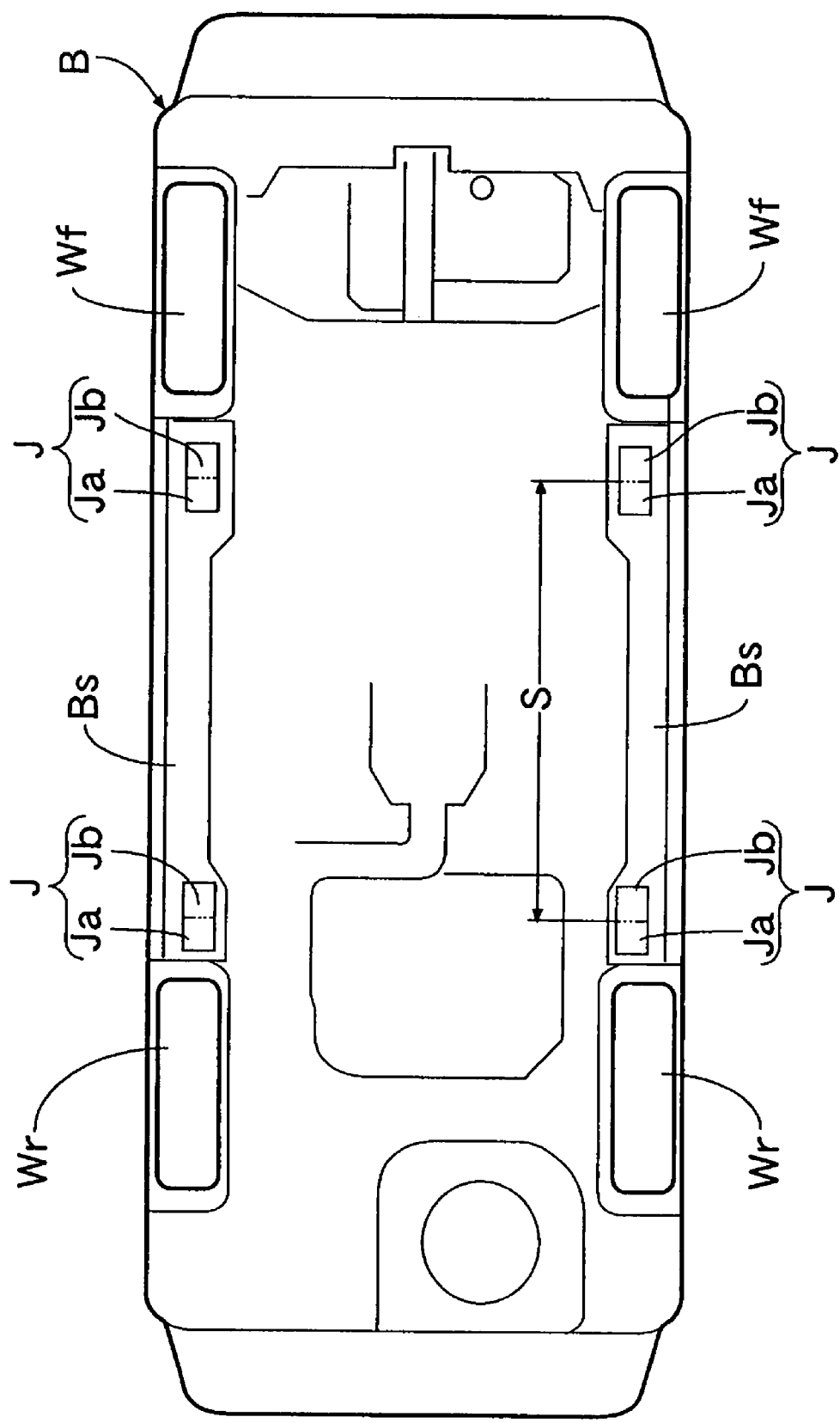
FIG. 3 is a bottom view of the body transferred by the automotive body transfer system (first embodiment).

As a portion of the body B during assembly that is supported by the first and second transfer means 5 and 6 and the transferred-to means 3, 3; 3, 3, as shown in FIG. 3, one longitudinal half Ja, Ja; Ja, Ja and the other half Jb, Jb; Jb, Jb of each of front and rear pairs of left and right jack-up brackets J, J; J, J, that is, a total of four, formed on a lower face of left and right side sills Bs and Bs of the body B are used. The jack-up brackets J, J; J, J are portions with which a push-up section of a jack is contacted when jacking up the body B.

As shown in FIG. 4 to FIG. 8, a pit 10 is formed between the first and second conveyor lines 1 and 4, the pit passing between the left and right slat conveyors 1a, 1a; 4a, 4a, and the first and second transfer means 5 and 6 move on a pair of left and right rails 11 and 11 provided on the base of the pit 10.

Since the first and second transfer means 5 and 6 have identical arrangements, the arrangement of the first transfer means 5 is explained as being representative thereof. The first transfer means 5 includes a carriage 13 having a plurality of wheels 12 rolling on the rails 11 and 11, and an electric motor 14 capable of driving some of the wheels 12 is mounted on the carriage 13. This carriage 13 is therefore self-propelled.

A horizontal raise/lower platform 15 is vertically movably supported on the carriage 13 via a pair of front and rear lifters 16 and 16. Each lifter 16 includes a rack 18 joined to the raise/lower platform 15 by vertically movably mating with a guide tube 17 uprightly provided on the carriage 13, a pinion shaft 20 pivotably supported by a bearing stand 19 uprightly provided on the carriage 13, and a pinion 21 fixedly provided on the pinion shaft 20 and meshing with the rack 18. The pinion shaft 20 is shared by the front and rear lifters 16 and 16 and provides an integral connection between the pinions 21 and 21 of the two lifters 16 and 16, and one end of the pinion shaft 20 is connected to an output shaft of an electric motor 22 supported by the bearing stand 19. When the electric motor 22 is driven forward or backward, the pinions 21 and 21 of the two lifters 16 and 16 can be rotated forward or backward at the same time via the pinion shaft 20, thus raising or lowering the raise/lower platform 15 via the front and rear racks 18 and 18.

A pair of front and rear support tables 25 and 25 are longitudinally movably mounted on the raise/lower platform 15 via guide rails 26 and 26, the raise/lower platform 15 is equipped with actuators 27 and 27, such as hydraulic cylinders, that can adjust the longitudinal movement of the two support tables 25 and 25 respectively, and operation of these actuators 27 and 27 enables the longitudinal distance between the support tables 25 and 25 to be adjusted. In this case, the same adjustment can be carried out by fixing one of the support tables 25 to the raise/lower platform 15 and making only the other support table 25 longitudinally movable.

Front and rear pairs of left and right support arms 28, 28; 28, 28, that is, a total of four, are mounted on each of the support tables 25 via vertical pivots 29, 29; 29, 29, each of the support arms 28 being capable of pivoting between a retracted position K in which it is retracted over the support table 25 and a working position L in which it extends outward of the support table 25, the four support arms 28, 28; 28, 28 having synthetic resin receiving pads 28a, 28a; 28a, 28a provided at extremities, and the receiving pads 28a, 28a; 28a, 28a being capable of supporting one longitudinal half Ja, Ja; Ja, Ja of each of the four jack-up brackets J, J; J, J when the support arms 28, 28; 28, 28 pivot to the working position L. Formed integrally with each of the support arms 28 is a pinion 23 coaxial with the pivot 29, an actuator 38 mounted on the support table 25 being connected to a rack plate 24 equipped on opposite sides with racks that mesh with the pinions 23 and 23 of the paired left and right support arms 28 and 28. Operation of the actuator 38 makes the rack plate 24 move longitudinally and enables the left and right support arms 28 and 28 simultaneously to pivot between the retracted position K and the working position L.

The arrangement of the four transferred-to means 3, 3; 3, 3 of the stationary assembly station 2 is now explained by reference to FIG. 9 to FIG. 13. The four transferred-to means 3, 3; 3, 3 are disposed so as to correspond to the four jack-up brackets J, J; J, J of the body B.

Each of the transferred-to means 3 is formed from a stationary stage 30, a movable stage 33 movably connected to the stationary stage 30 via first guide rails 31 and 31, which are parallel to the rails 11 and 11, a first actuator 34 capable of moving and adjusting the movable stage 33, a support rod 36 movably connected to the movable stage 33 via second guide rails 32 and 32 extending in a direction that is perpendicular to the first guide rails 31 and 31, and a second actuator 35 capable of moving the support rod 36. The support rod 36 is provided at its extremity with a synthetic resin receiving pad 36a and can move, by operation of the second actuator 35, between a forward position M in which the receiving pad 36a is opposite the other half Jb of the jack-up bracket J and a retreat position N in which the receiving pad 36a is withdrawn outward of the body B.

The operation of the above-mentioned embodiment is now explained.

First, in the first and second transfer means 5 and 6, the positions of the front and rear support tables 25 and 25 are adjusted so that, when the four support arms 28, 28; 28, 28 are opened at the working position L, the longitudinal distance S1 between the support arms 28, 28; 28, 28 coincides with the longitudinal distance S between the front and rear jack-up brackets J, J; J, J of the body B and, furthermore, in the transferred-to means 3, 3; 3, 3, the distance between the front and rear movable stages 33 and 33 is adjusted so that the longitudinal distance S2 between the four support rods 36, 36; 36, 36 coincides with the distance S between the front and rear jack-up brackets J and J of the body B.

Figure 4:
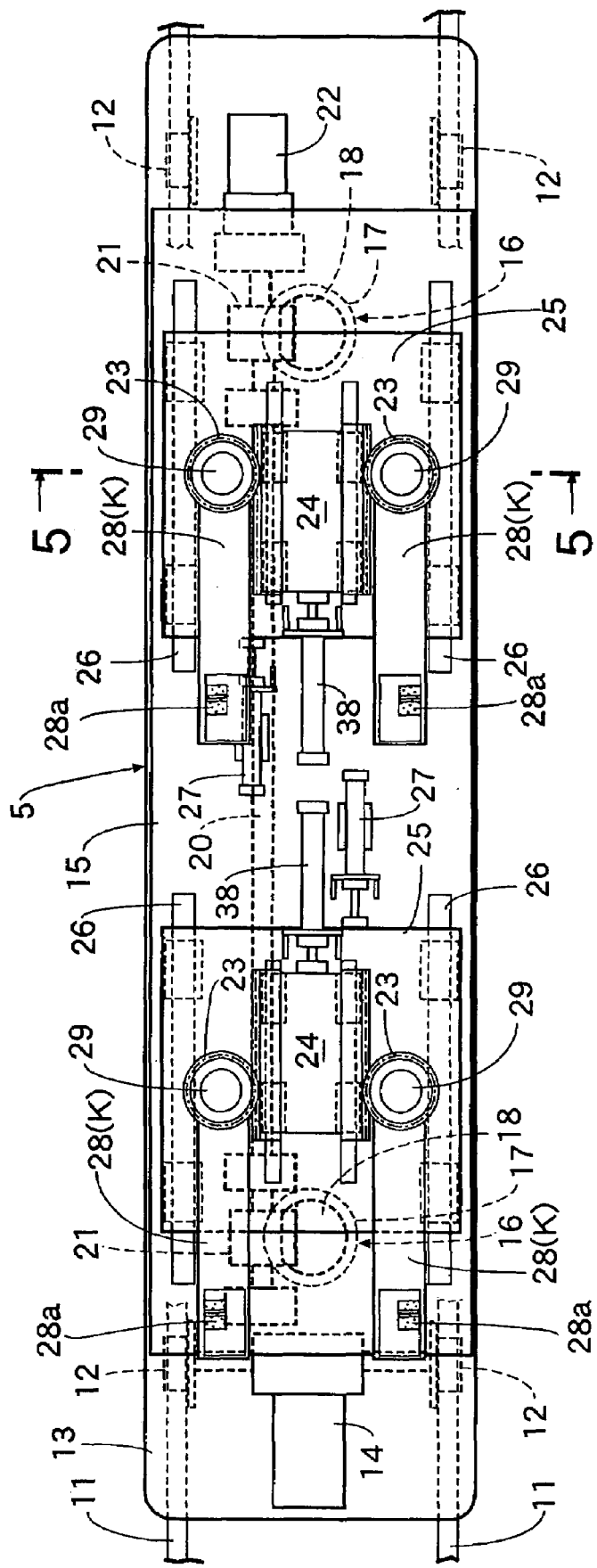
FIG. 4 is a plan view of first transfer means in FIG. 1 (first embodiment).
Figure 5:
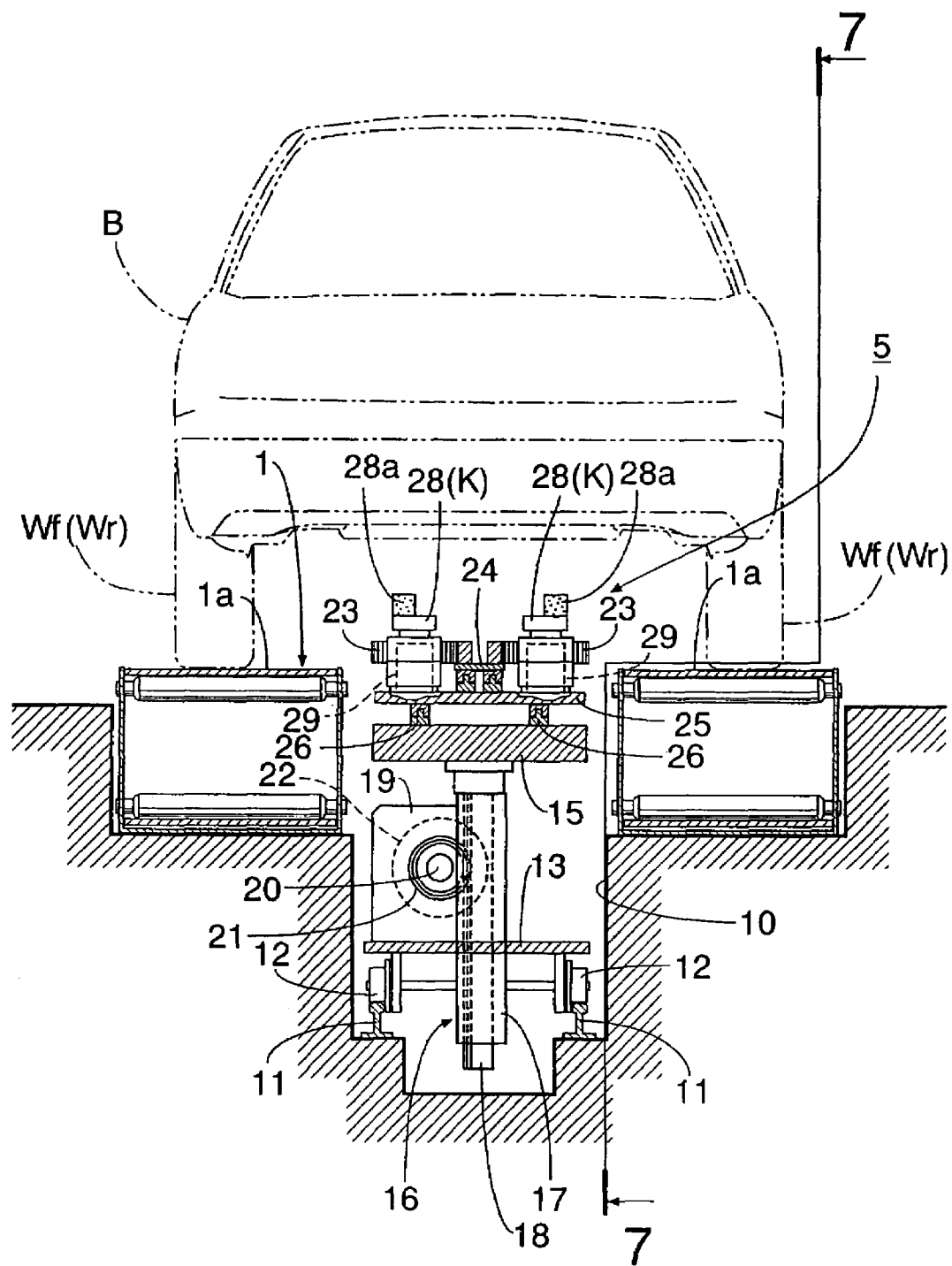
FIG. 5 is a sectional view along line 5-5 in FIG. 4 (first embodiment).

Subsequently, as shown in FIG. 2 (A), the first transfer means 5 is held in readiness at an endpoint of the first conveyor line 1. In this process, the four support arms 28, 28; 28, 28 of the first transfer means 5 are closed at the retracted position K as shown in FIG. 4 (solid line position), FIG. 5, and FIG. 7 so as to avoid interference with the front and rear wheels Wf and Wr of the body B conveyed to the endpoint of the first conveyor line 1.

Figure 6:
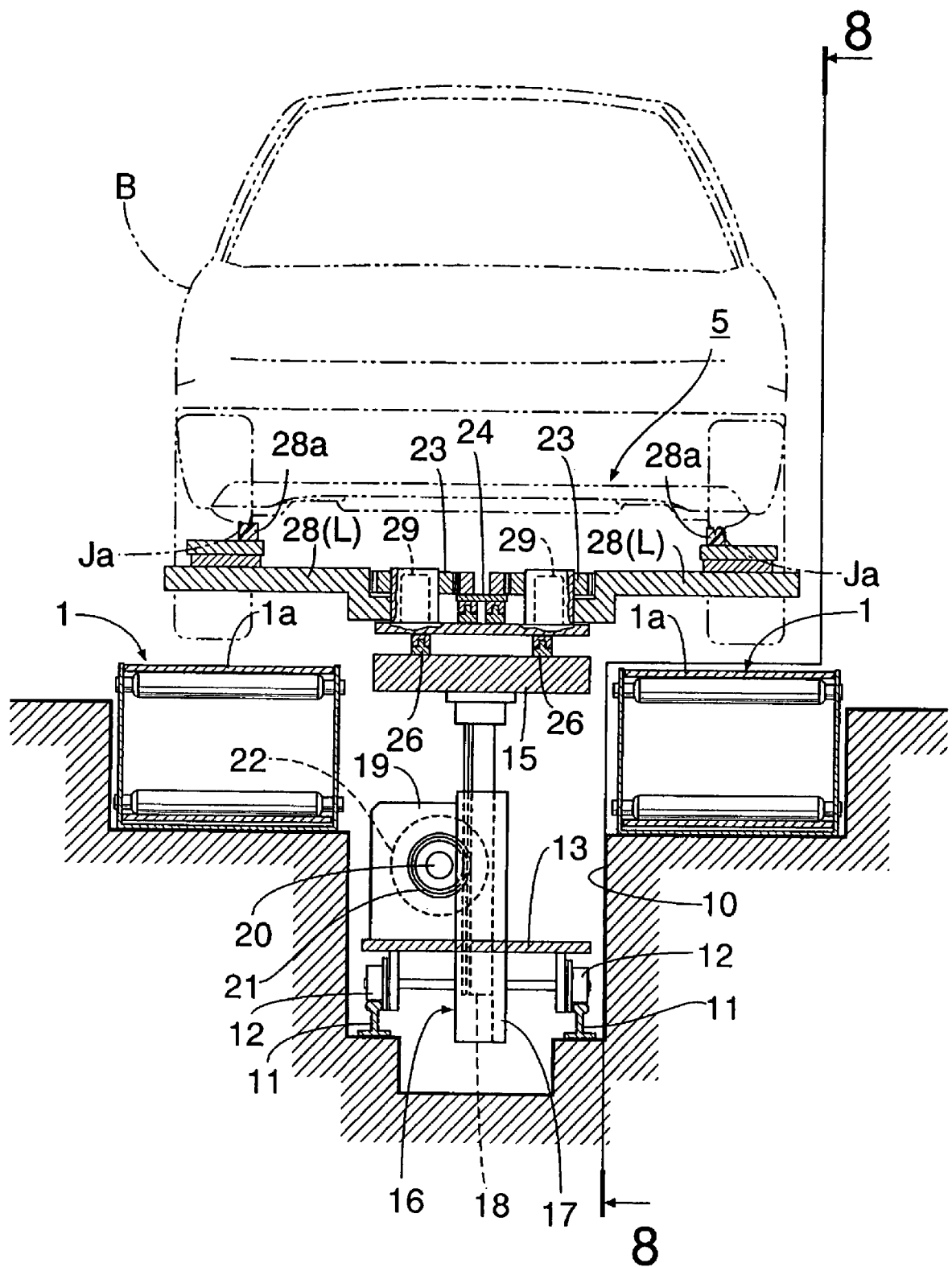
FIG. 6 is a diagram, corresponding to FIG. 4, for explaining the operation (first embodiment).
Figure 7:
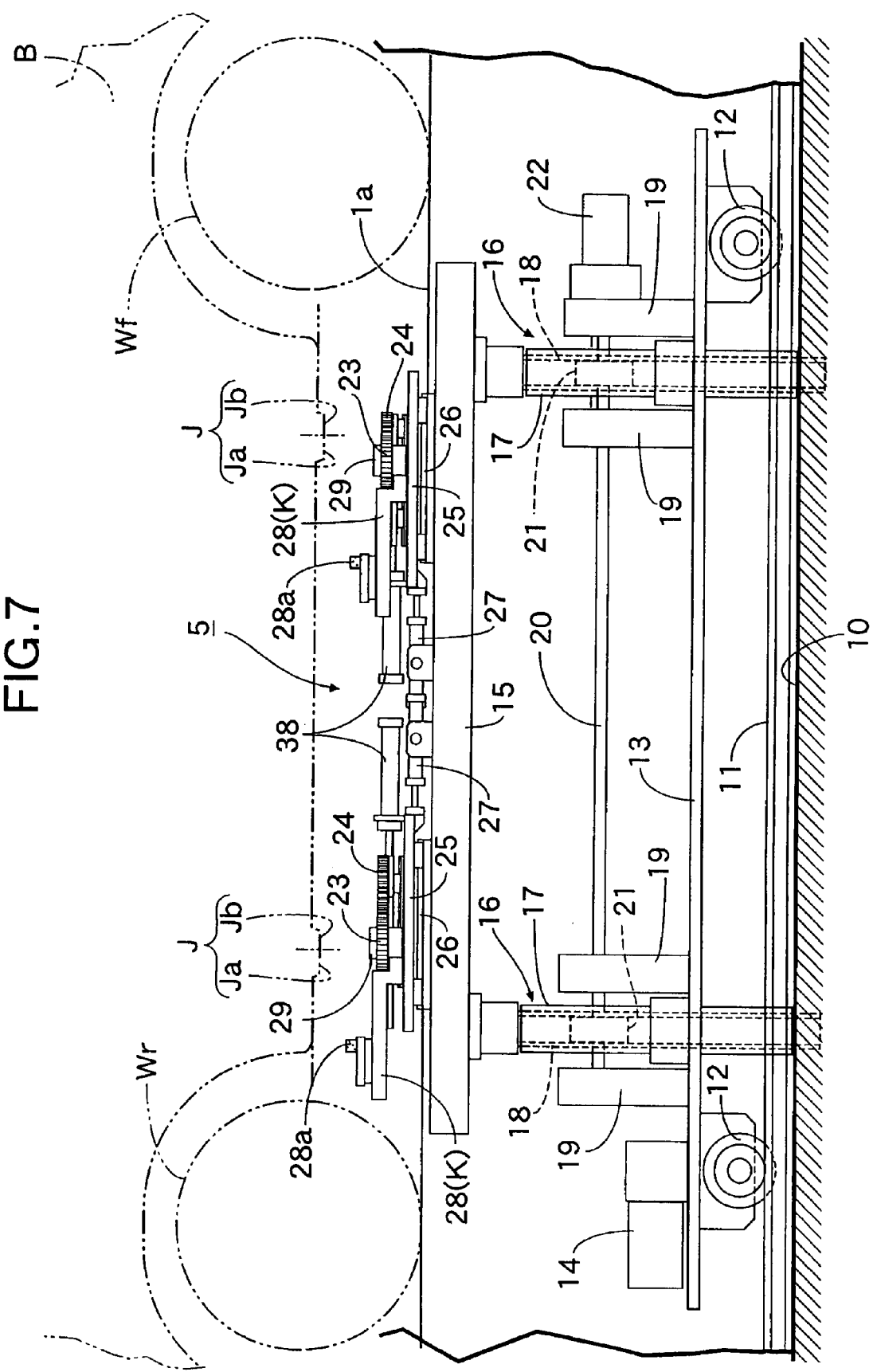
FIG. 7 is a sectional view along line 7-7 in FIG. 5 (first embodiment).
Figure 8:
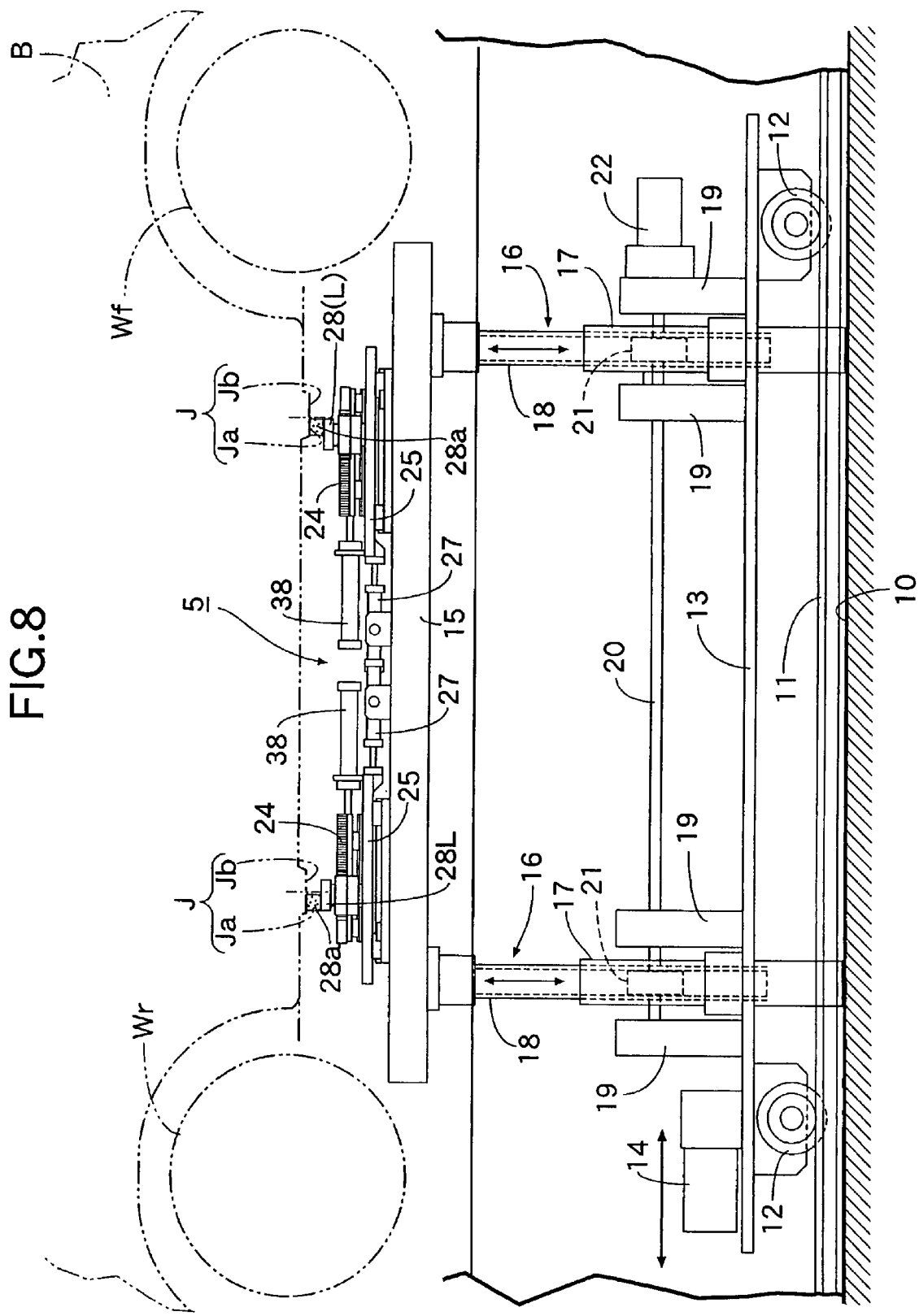
FIG. 8 is a sectional view along line 8-8 in FIG. 6 (first embodiment).
Figure 9:
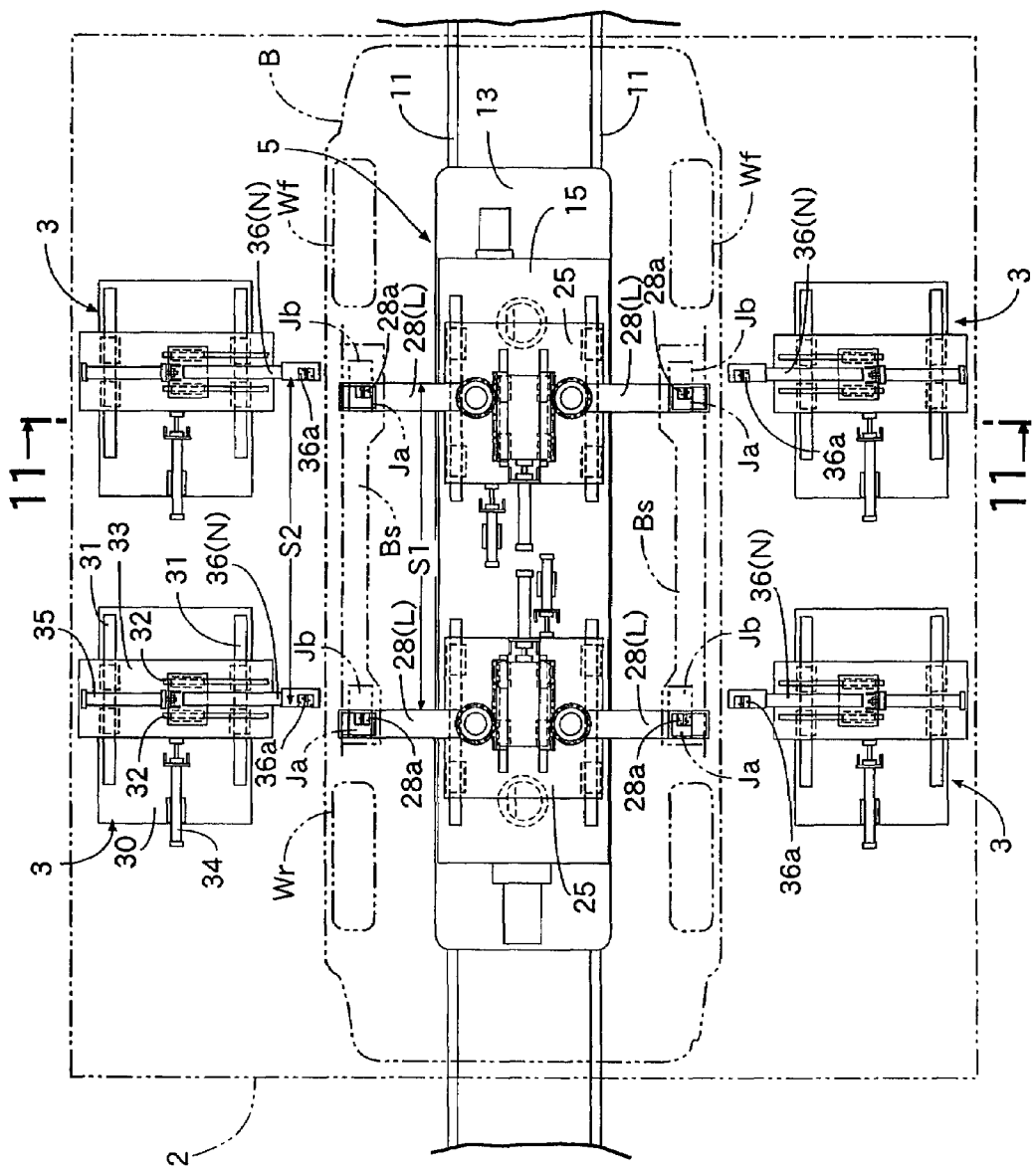
FIG. 9 is a plan view of a stationary assembly station in FIG. 1 (first embodiment).

When the body B reaches the endpoint of the first conveyor line 1, the four support arms 28, 28; 28, 28 of the first transfer means 5 are opened to the working position L (ref. FIGS. 6, 8 and 9), and subsequently the raise/lower platform 15 is made to rise by the lifters 16 and 16, thereby pushing the body B above the first conveyor line 1 while the receiving pads 28a, 28a; 28a, 28a of the four support arms 28, 28; 28, 28 are receiving one longitudinal half Ja, Ja; Ja, Ja of each of the four jack-up brackets J, J; J, J of the body B. That is, the front and rear wheels Wf and Wr of the body B are lifted from the slat conveyors 1a and 1a (ref. FIG. 7 and FIG. 8).

On the other hand, as shown in FIG. 9, in the stationary assembly station 2, the support rods 36, 36; 36, 36 of the four transferred-to means 3, 3; 3, 3 are returned to the retreat position N and held in readiness.

Figure 10:
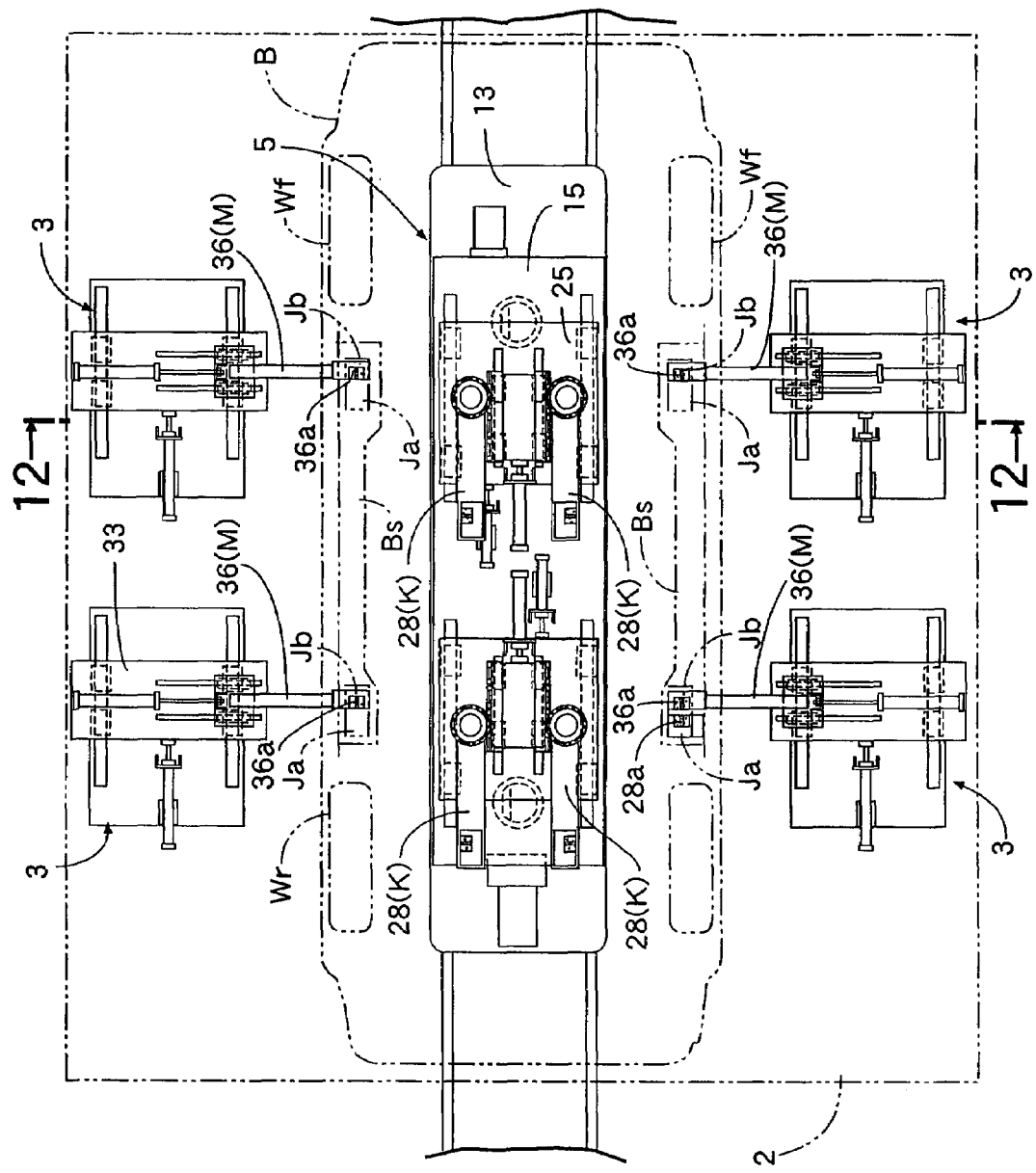
FIG. 10 is a diagram, corresponding to FIG. 9, for explaining the operation (first embodiment).
Figure 11:
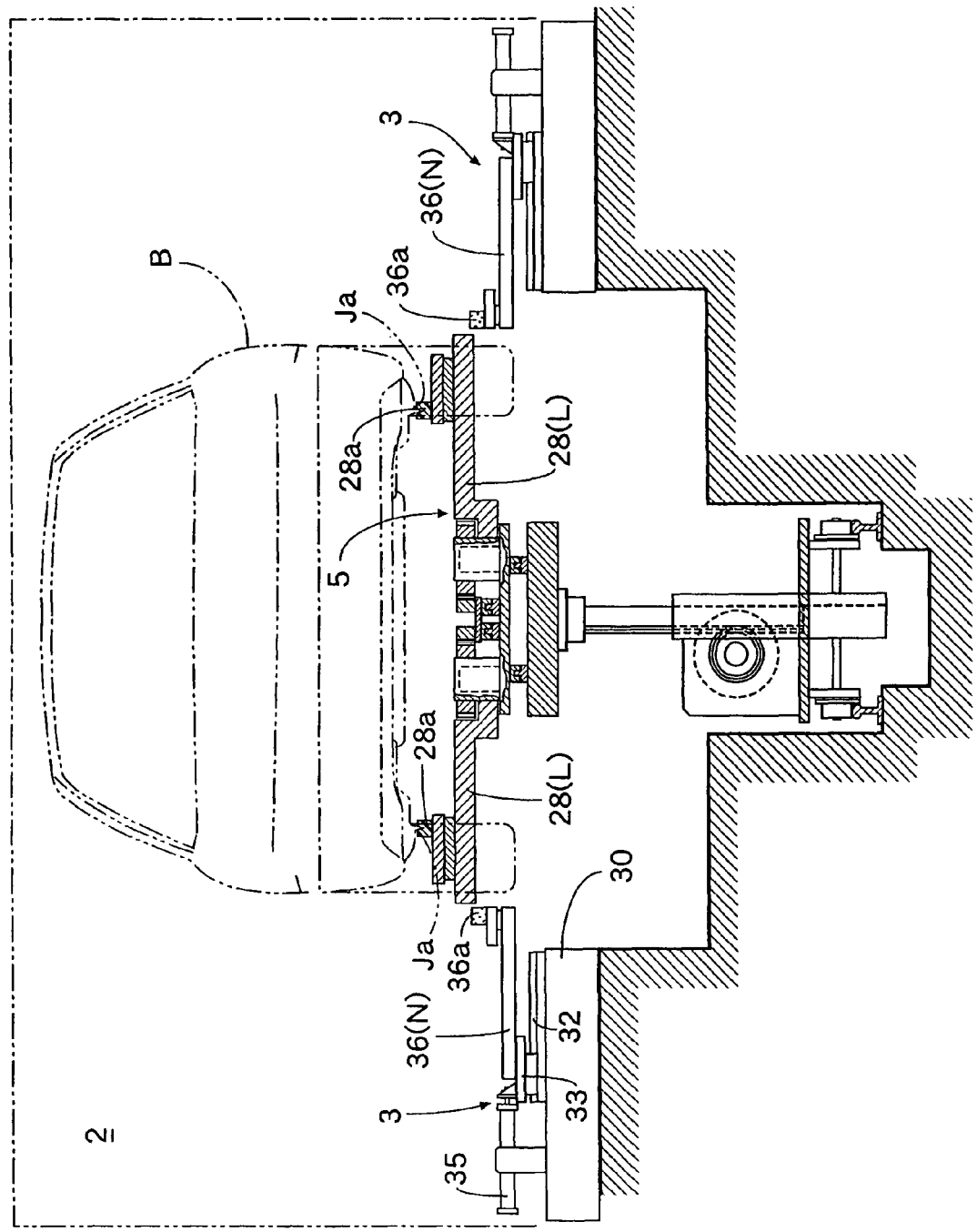
FIG. 11 is a sectional view along line 11-11 in FIG. 9 (first embodiment).
Figure 12:
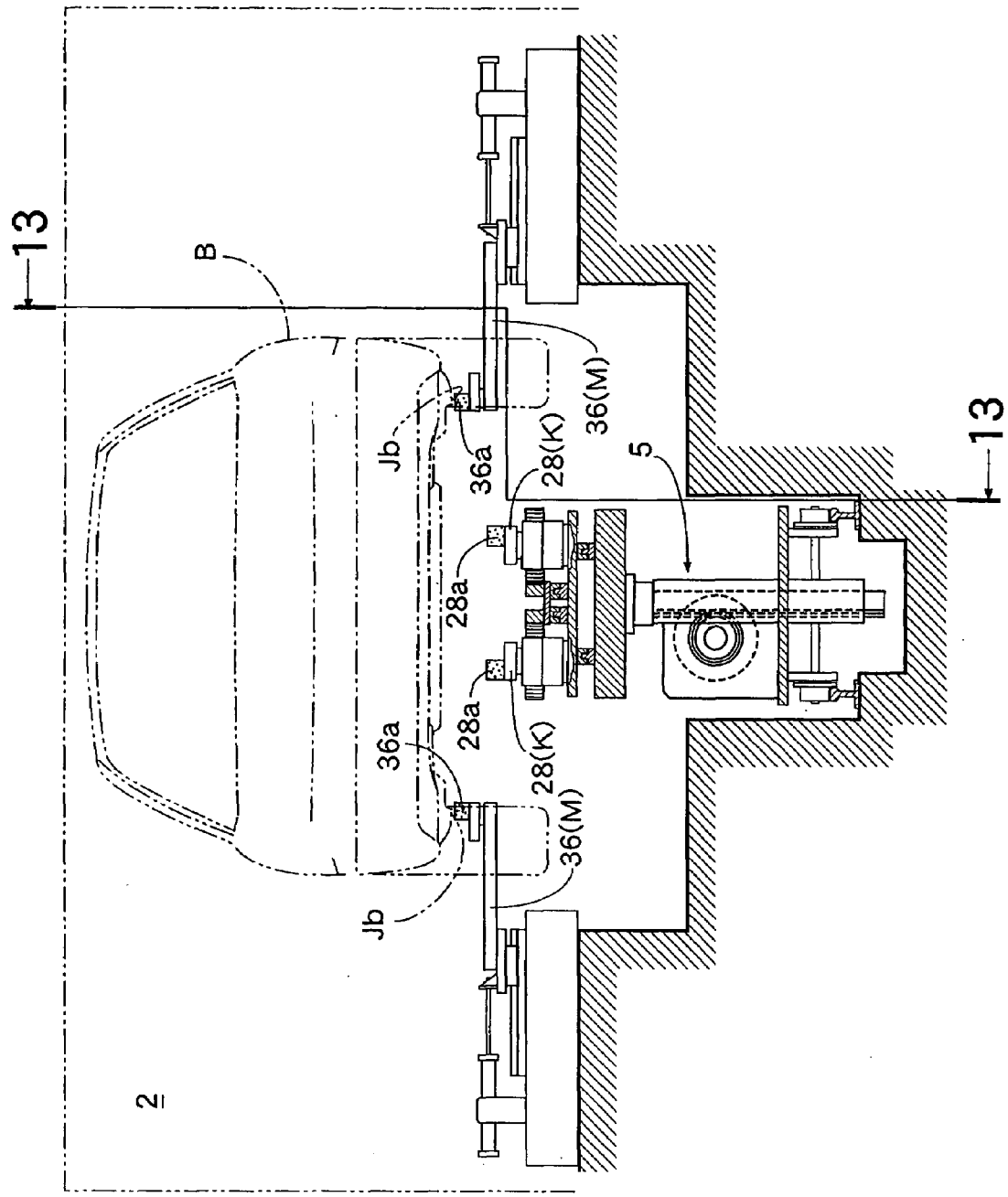
FIG. 12 is a diagram, corresponding to FIG. 11, for explaining the operation, shown by a sectional view along line 12-12 in FIG. 10 (first embodiment).

Subsequently, as shown in FIG. 2 (B), the carriage 13 of the first transfer means 5 pushing up the body B is moved to a predetermined position of the stationary assembly station 2. Following this, the support rods 36, 36; 36, 36 of the four transferred-to means 3, 3; 3, 3 are first made to project to the forward position M as shown in FIG. 10, and the receiving pads 36a, 36a; 36a, 36a thereof are made to face lower faces of the other longitudinal half Jb, Jb; Jb, Jb of the four jack-up brackets J, J; J, J of the body B.

Subsequently, as shown in FIG. 2 (C), in the first transfer means 5, the raise/lower platform 15 is made to lower together with the body B by the lifters 16 and 16, and the other longitudinal half Jb, Jb; Jb, Jb of the four jack-up brackets J, J; J, J of the body B is received by the receiving pads 36a, 36a; 36a, 36a. In this way, the body B is transferred to the four transferred-to means 3, 3; 3, 3 of the stationary assembly station 2. In this stage, as shown in FIG. 2 (D), this body B is subjected to an assembly operation in which, for example, a front windshield Gf and a rear windshield Gr are mounted by an assembly robot R.

During such an assembly operation, the carriage 13 of the first transfer means 5 is moved back to the endpoint of the first conveyor line 1, and the four support arms 28, 28; 28, 28 thereof are closed at the retracted position K, thus becoming prepared for transfer of the next body B.

Taking over from this, the carriage 13 of the second transfer means 6 is delivered to the stationary assembly station 2 from the second conveyor line 4 side, the four support arms 28, 28; 28, 28 thereof are opened at the working position L, and the body B is pushed above the four support rods 36, 36; 36, 36 by making the raise/lower platform 15 rise by means of the lifters 16 and 16 while the receiving pads 28a, 28a; 28a, 28a of the four support arms 28, 28; 28, 28 are receiving the longitudinal half Ja, Ja; Ja, Ja of the four jack-up brackets J, J; J, J of the body B (ref. FIG. 2 (E)).

Subsequently, as shown in FIG. 2 (F), after the carriage 13 of the second transfer means 6 is moved to a starting point of the second conveyor line 4, the raise/lower platform 15 is made to lower by the lifters 16 and 16 and the four support arms 28, 28; 28, 28 are closed at the retracted position K. By so doing, the body B is transferred to the second conveyor line 4, and can be conveyed in another direction by the second conveyor line 4 while avoiding interference between the support arms 28, 28; 28, 28 of the second transfer means 6 and the front and rear wheels Wf and Wr. On the other hand, the support rods 36, 36; 36, 36 of the four transferred-to means 3, 3; 3, 3 are returned to the retreat position N again.

At the same time as the above, a new body B that has reached the endpoint of the first conveyor line 1 is moved to the stationary assembly station 2 by the first transfer means 5. The same procedure is repeated thereafter.

Since the front and rear pairs of left and right jack-up brackets J, J; J, J, that is, a total of four, formed in the lower parts of the left and right side sills Bs and Bs of the body B used for transfer of the body B during assembly are regularly arranged at the four apexes of an imaginary horizontal quadrilateral, transfer of the body B can be appropriately carried out while simplifying the shape and structure of the support arms 28, 28; 28, 28 of each of the first and second transfer means 5 and 6 and the support rods 36, 36; 36, 36 of the four transferred-to means 3, 3; 3, 3.

When the format and dimensions of a body B that is to be transferred change and the longitudinal distance between the four jack-up brackets J, J; J, J changes, by adjusting the longitudinal distance between the four support arms 28, 28; 28, 28 in each of the transfer means 5 and 6 and adjusting the longitudinal distance between the support rods 36, 36; 36, 36 of the four transferred-to means 3, 3; 3, 3, transfer of the body B can be responded to immediately, thus contributing to an improvement in the efficiency of production of various models.

The present invention is not limited by the above-mentioned embodiment, and may be modified in a variety of ways as long as the modifications do not depart from the spirit and scope thereof. For example, transfer of the body B from the first conveyor line 1 to the stationary assembly station 2 and transfer of the body B from the stationary assembly station 2 to the second conveyor line 4 may be carried out by one transfer means 5 or 6.

The invention claimed is:

1. An automotive body transfer method for handing over a body between a transfer mechanism and a stationary assembly station in an automobile production process, the method comprising the steps of:
   supporting one longitudinal half of each of front and rear pairs of left and right jack-up brackets formed in lower parts of left and right side sills of the body by the transfer mechanism,
   moving the body towards the stationary assembly station using the transfer mechanism,
   lowering the body on a supporting platform of the transfer mechanism,
   placing the body on the stationary assembly station, thereby transferring the body to the stationary assembly station,
   supporting the other longitudinal half of each of the jack-up brackets by a component of the stationary assembly station,
   positioning the body in the stationary assembly station,
   assembling a component part on the vehicle body at the stationary assembly station, and
   taking the body away from the stationary assembly station with the transfer mechanism.

2. An automotive body transfer system for carrying out handing over of a body between a transfer mechanism and a stationary assembly station in an automobile production process,
   wherein the transfer mechanism comprises a carrier for moving along a conveying direction of the body, said carrier comprising front and rear pairs of left and right support arms capable of supporting one longitudinal half of each of front and rear pairs of left and right jack-up brackets formed in lower parts of left and right side sills of the body, respectively,
   wherein the transfer mechanism is configured and arranged so that each of the support arms can pivot between a working position in which said one longitudinal half is supported, and a retracted position in which the support arms are moved back toward the inside of the body and so that the support arms can move up and down,
   and the stationary assembly station comprises front and rear pairs of left and right support members, each of said support members comprising a support rod disposed so as to be able to support the other longitudinal half of a corresponding one of the jack-up brackets,
   and wherein bringing-in and taking-out of the body relative to the stationary assembly station is carried out by the transfer mechanism.

3. The automotive body transfer system according to claim 2, wherein a longitudinal distance between the support arms is adjustable, and a longitudinal distance between the support members is also adjustable.

4. The automotive body transfer method according to claim 1, wherein the body is provided with wheels and a lower face of the body is fixed and supported by the stationary assembly station to enable parts to be mounted to an upper part of the body.

5. The automotive body transfer system according to claim 2, wherein the body is provided with wheels, and a lower face of the body is fixed and supported by the stationary assembly station to enable parts to be mounted to an upper part of the body.

6. The automotive body transfer system according to claim 3, wherein the body is provided with wheels, and a lower face of the body is fixed and supported by the stationary assembly station to enable parts to be mounted to an upper part of the body.

7. An automotive body transfer method for use as part of an automobile production process, said method comprising the steps of:
   a) moving a vehicle body on a first conveyor to an end portion thereof;
   b) pivotally moving support arms of a first transfer mechanism to engage the vehicle body at specified portions of respective jack-up brackets thereon;
   c) raising a platform portion of the first transfer mechanism to elevate the vehicle body thereon;
   d) moving the first transfer mechanism along rails provided, to thereby transport the vehicle body;
   e) aligning the vehicle body with a stationary assembly station comprising four support members, where each of said support members comprises a support rod having a receiving pad on a distal end portion thereof for engaging below other specified portions of the respective jack-up brackets;
   f) lowering the platform portion of the first transfer mechanism so that the vehicle body rests on the support members of the stationary assembly station;
   g) moving the first transfer mechanism back towards the first conveyor and away from the vehicle body; and
   h) assembling a component part on the vehicle body at the stationary assembly station.

8. The method of claim 7, further comprising the steps of:
   i) moving a designated transfer mechanism to align the designated transfer mechanism with the stationary assembly station, where said designated transfer mechanism is either the first transfer mechanism or a second transfer mechanism which is structurally similar to the first transfer mechanism;
   j) pivotally moving support arms of the designated transfer mechanism to engage below specified portions of respective jack-up brackets;
   k) raising a platform portion of the designated transfer mechanism and the vehicle body mounted thereon;
   l) moving the designated transfer mechanism along rails provided to transport the vehicle body to a second conveyor;
   m) lowering the platform portion of the designated transfer mechanism; and
   n) placing the vehicle body on the second conveyor.

* * * * *